(12) United States Patent
Yoshida

(10) Patent No.: US 7,937,587 B2
(45) Date of Patent: May 3, 2011

(54) COMMUNICATION TERMINAL APPARATUS AND INFORMATION COMMUNICATION METHOD

(75) Inventor: Osamu Yoshida, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/539,519

(22) Filed: Aug. 11, 2009

(65) Prior Publication Data

US 2010/0169648 A1   Jul. 1, 2010

(30) Foreign Application Priority Data

Dec. 26, 2008   (JP) ................. 2008-335306

(51) Int. Cl.
*H04L 9/00* (2006.01)
*G06F 7/04* (2006.01)

(52) U.S. Cl. ........ 713/168; 713/169; 713/170; 713/171; 713/172; 713/173; 726/2; 726/3; 726/4; 726/5; 726/6; 726/27; 726/28; 726/29; 726/30

(58) Field of Classification Search .................... 713/168
See application file for complete search history.

(56) References Cited

U.S. PATENT DOCUMENTS

| | | | |
|---|---|---|---|
| 5,657,390 A | 8/1997 | Elgamal et al. | |
| 2001/0016907 A1* | 8/2001 | Kang et al. | 713/152 |

FOREIGN PATENT DOCUMENTS

| | | |
|---|---|---|
| JP | 2001-166996 | 6/2001 |
| JP | 2001-344214 | 12/2001 |
| JP | 2002-169621 A | 6/2002 |
| JP | 2002-215591 A | 8/2002 |
| JP | 2003-132313 | 5/2003 |
| JP | 2004-078424 A | 3/2004 |
| JP | 2004-236105 A | 8/2004 |
| JP | 2004-295260 A | 10/2004 |
| JP | 2006-031640 | 2/2006 |

OTHER PUBLICATIONS

M. Ohmori et al; "An On-line Shopping System Protecting User's Privacy"; Technical Report of IEICE; Oct. 20, 1994; vol. 94 No. 297; the Institute of Electronics, Information and Communication Engineers; Japan.
Japanese Office Action dated Nov. 10, 2009, Japanese Patent Application No. 2008-335306.
Japanese Decision of Patent Grant dated Apr. 20, 2010, Japanese Patent Application No. 2008-335306.

* cited by examiner

*Primary Examiner* — Longbit Chai
(74) *Attorney, Agent, or Firm* — Patterson & Sheridan, LLP

(57) ABSTRACT

An information communication method performed by a communication terminal apparatus, the method including: sharing a first encryption key with a first server; receiving a request for sending identification information of the communication terminal apparatus; authenticating the first server based on certificate information of the first server that is acquired while sharing the first encryption key and verification information retained in the communication terminal apparatus; encrypting the identification information of the communication terminal apparatus using a second encryption key; and encrypting, using the first encryption key, according to an authentication result, encrypted identification information of the communication terminal apparatus as generated by using the second encryption key, and transmitting resulting double-encrypted identification information of the communication terminal apparatus to the first server.

7 Claims, 11 Drawing Sheets

COMMUNICATION TERMINAL APPARATUS AND INFORMATION COMMUNICATION METHOD

CROSS REFERENCE TO RELATED APPLICATION(S)

The present disclosure relates to the subject matters contained in Japanese Patent Application No. 2008-335306 filed on Dec. 26, 2008, which are incorporated herein by reference in its entirety.

FIELD

The present invention relates to an information communication method for encrypting information that is unique to a communication terminal apparatus in, for example, distributing a content over a network, as well as to a related communication terminal apparatus and information communication system.

BACKGROUND

Generally, when it is desired to exchange information securely with, for example, a portal server, a user-side communication terminal apparatus establishes an SSL (secure sockets layer) session. According to the SSL, a data encryption key is shared by a communication terminal apparatus and a server through key exchange done according to public key encryption and encrypted messages are exchanged. An example of such transactions is disclosed in U.S. Pat. No. 5,657,390. This protocol is also prescribed as RFC (request for comment) 4346 "The Transport Layer Security Protocol Version 1.1."

Examples of the user-side communication terminal apparatus are image display apparatus such as digital broadcast receiving apparatus (TV receivers). A digital broadcast receiving apparatus establishes an SSL session with a portal server and, for example, displays an image that is delivered from the portal server.

In the above-described technique, in many cases, the server-side configuration is such that a portal server and a customer management server are provided separately. As a result, to provide a service that is unique to a customer or a terminal apparatus, it is necessary to authenticate the customer or the terminal apparatus through input of an ID, a password, or the like.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

DETAILED DESCRIPTION OF THE EMBODIMENTS

Embodiments of the present invention will be hereinafter described in detail with reference to the drawings. The embodiments are directed to a digital broadcast receiving apparatus which is an example communication terminal apparatus.

First Embodiment

Figure 1:
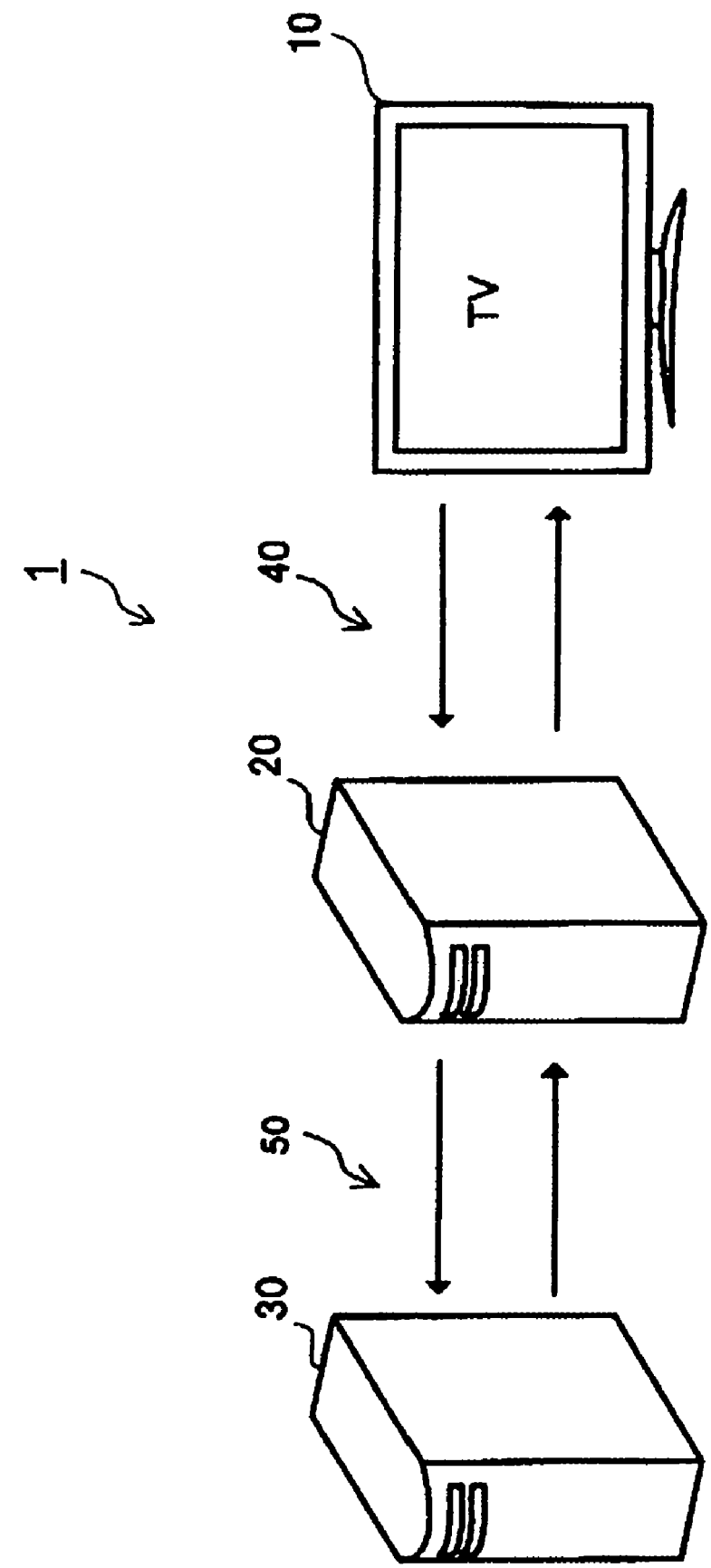
FIG. 1 is a conceptual diagram showing the configuration of an information communication system according to a first embodiment of the invention.

FIG. 1 is a conceptual diagram showing the configuration of an information communication system 1 according to a first embodiment of the invention.

The information communication system 1 includes a communication terminal apparatus 10, a portal server 20, and a customer management server 30. The communication terminal apparatus 10 and the portal server 20 are connected to each other by an Internet communication network or the like (denoted by reference numeral 40). The portal server 20 and the customer management server 30 are connected to each other by a dedicated line, a LAN, or the like (denoted by reference numeral 50).

The communication terminal apparatus 10 receives digital broadcast radio waves via an antenna (not shown). The communication terminal apparatus 10 sends a chargeable program reception history to the portal server 20 of a service providing company. The communication terminal apparatus 10 acquires contents from the portal server 20. The communication terminal apparatus 10 is equipped with a monitor for displaying a content image, speakers (not shown) for generating content sound, a card slot (not shown) into which an IC card 151 for restrictive reception (described later) is to be inserted, and a remote control receiving module (not shown) for receiving an infrared signal from a remote controller 110.

Figure 2:
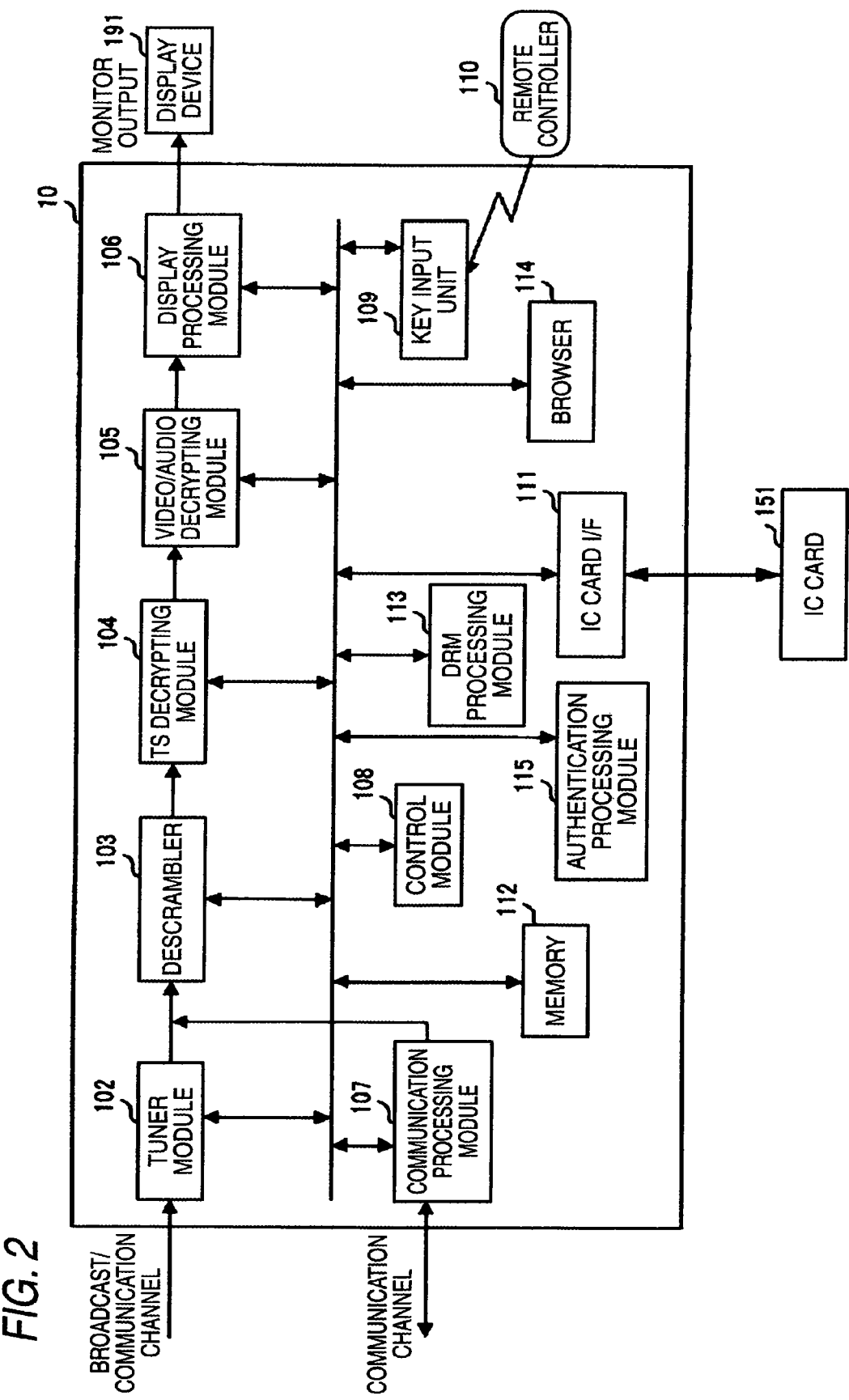
FIG. 2 is a block diagram showing the configuration of a communication terminal apparatus according to the first embodiment of the invention.

FIG. 2 is a block diagram showing the configuration of the communication terminal apparatus 10 according to the first embodiment of the invention. The communication terminal apparatus 10 is equipped with a tuner module 102, a descrambler 103, a TS decrypting module 104, a video/audio decrypting module 105, a display processing module 106, a communication processing module 107, a control module 108, a key input unit 109, the remote controller 110, an IC card interface (I/F) 111, a memory 112, a DRM processing module 113, a browser 114, and an authentication processing module 115.

Figure 3:
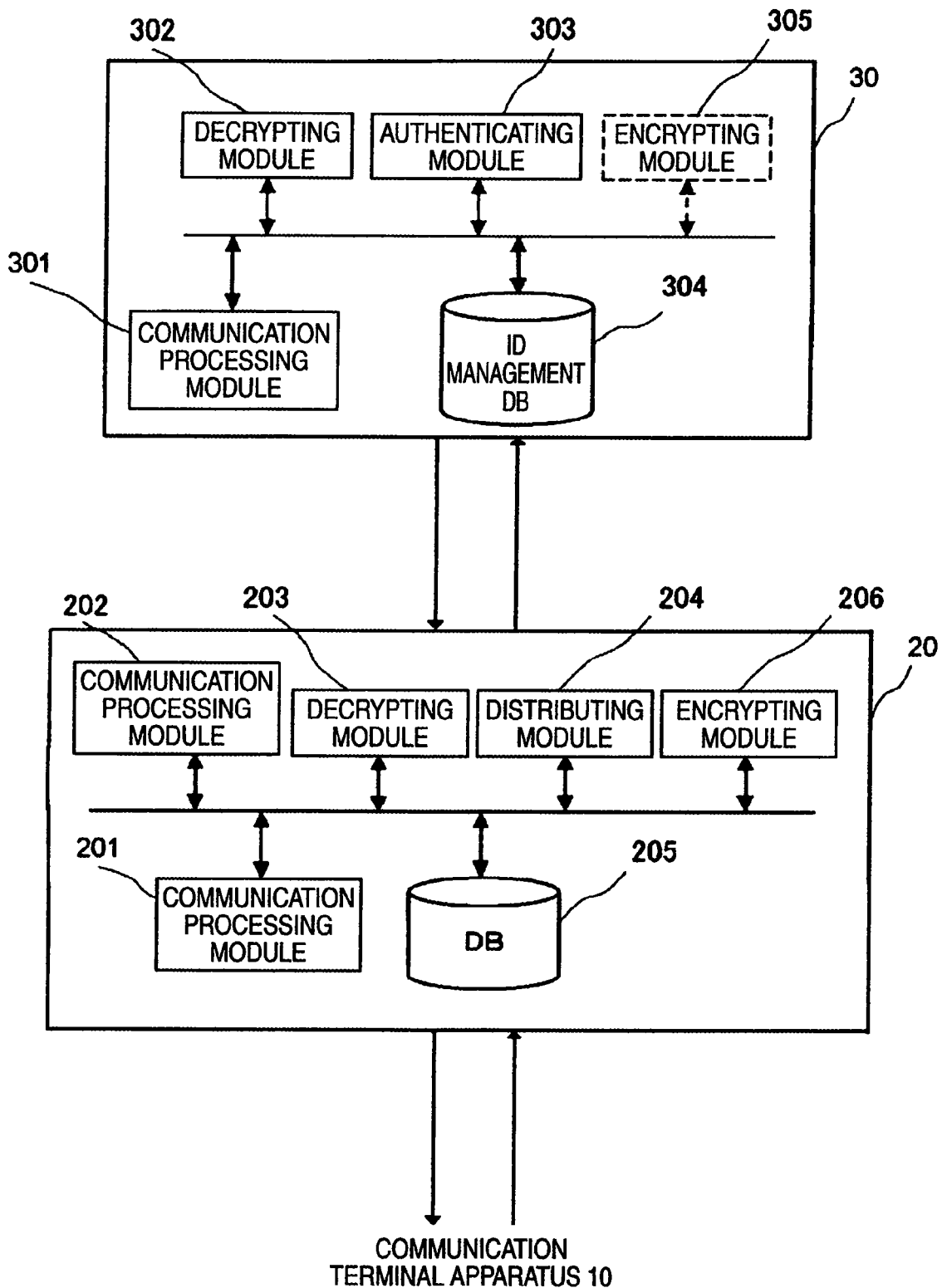
FIG. 3 is a block diagram showing general configurations of a portal server and a customer management server according to the first embodiment of the invention.

FIG. 3 is a block diagram showing general configurations of the portal server 20 and the customer management server 30 according to the first embodiment of the invention. The portal server 20 is equipped with communication processing modules 201 and 202, a decrypting module 203, a distributing module 204, a database 205, and an encrypting module 206.

The customer management server 30 is equipped with a communication processing module 301, a decrypting module 302, an authenticating module 303, and an ID management database 304.

The tuner module 102 tunes in to a signal, on a desired channel, of digital broadcast waves that are input to the communication terminal apparatus 10. The tuner module 102 outputs a transport stream (hereinafter abbreviated as TS) on the selected channel to the descrambler 103. The TS has been scrambled for protection of the content.

The descrambler 103 descrambles the TS received from the tuner module 102 or the communication processing module 107 and outputs a resulting TS to the TS decrypting module 104.

The TS decrypting module 104 separates necessary packets from the TS received from the descrambler 103. Furthermore, the TS decrypting module 104 extracts a broadcast program signal (video and audio) and separates various multiplexed data (e.g., various kinds of SI (service information), an ECM (entitlement control message), and an EMM (entitlement management message) from the separated packets. The TS decrypting module 104 outputs the separated broadcast program signal (video and audio) to the video/audio decrypting module 105.

The video/audio decrypting module 105 decrypts the broadcast program signal (video and audio) received from the TS decrypting module 104 and outputs a resulting signal to the display processing module 106.

The display processing module 106 generates display image signals of various kinds of error information to perform a user interface function. The display processing module 106 has a function of outputting the thus-generated image signal in place of or in combination with a broadcast program signal (video and audio). Furthermore, the display processing module 106 generates an EPG (electronic program guide) image signal that consists of SI data separated by the TS decrypting module 104. The display processing module 106 has a function of outputting the thus-generated image signal in place of or in combination with a broadcast program signal (video and audio).

The communication processing module 107 is connected to a network such as an Ethernet (registered trademark) and sends and receives data over the network. The communication processing module 107 has a function of receiving a content (through VOD (video on demand) service or IP (Internet protocol) broadcast) or a license from the portal server 20 on the service providing company side. Furthermore, the communication processing module 107 serves as a receiving module for receiving a request for transmission of a terminal identifier (ID) which is identification information of the communication terminal apparatus 10 and authentication information for authentication of the portal server 20.

The control module 108 is a control module for controlling the entire communication terminal apparatus 10. The control module 108 controls the functions of the individual blocks of the communication terminal apparatus 10 which are connected to the control module 108 by bus connection, serial communication connection, or the like.

The key input unit 109 receives information for reception of a content to be delivered from the portal server 20, information for viewing of a content, and other information, and includes a keyboard etc. The remote controller 110 has a function of receiving information in a similar manner.

As for a broadcast signal, a scramble key is obtained by sending an ECM to the IC card 151 which is connected to the communication terminal apparatus 10 via the IC card I/F 111. Descrambling is performed by setting the scramble key in the descrambler 103. As for a content that is received through communication, a key that is acquired from the portal server 20 by the DRM processing module 113 or a key obtained by decrypting an ECM by the DRM processing module 113.

Information relating to a terminal ID of the communication terminal apparatus 10 is stored in the memory 112 at the time of shipment, for example. When the communication terminal apparatus 10 makes a content access, one method for the customer management server 30 to identify the communication terminal apparatus 10 is to acquire the terminal ID.

Figure 4:
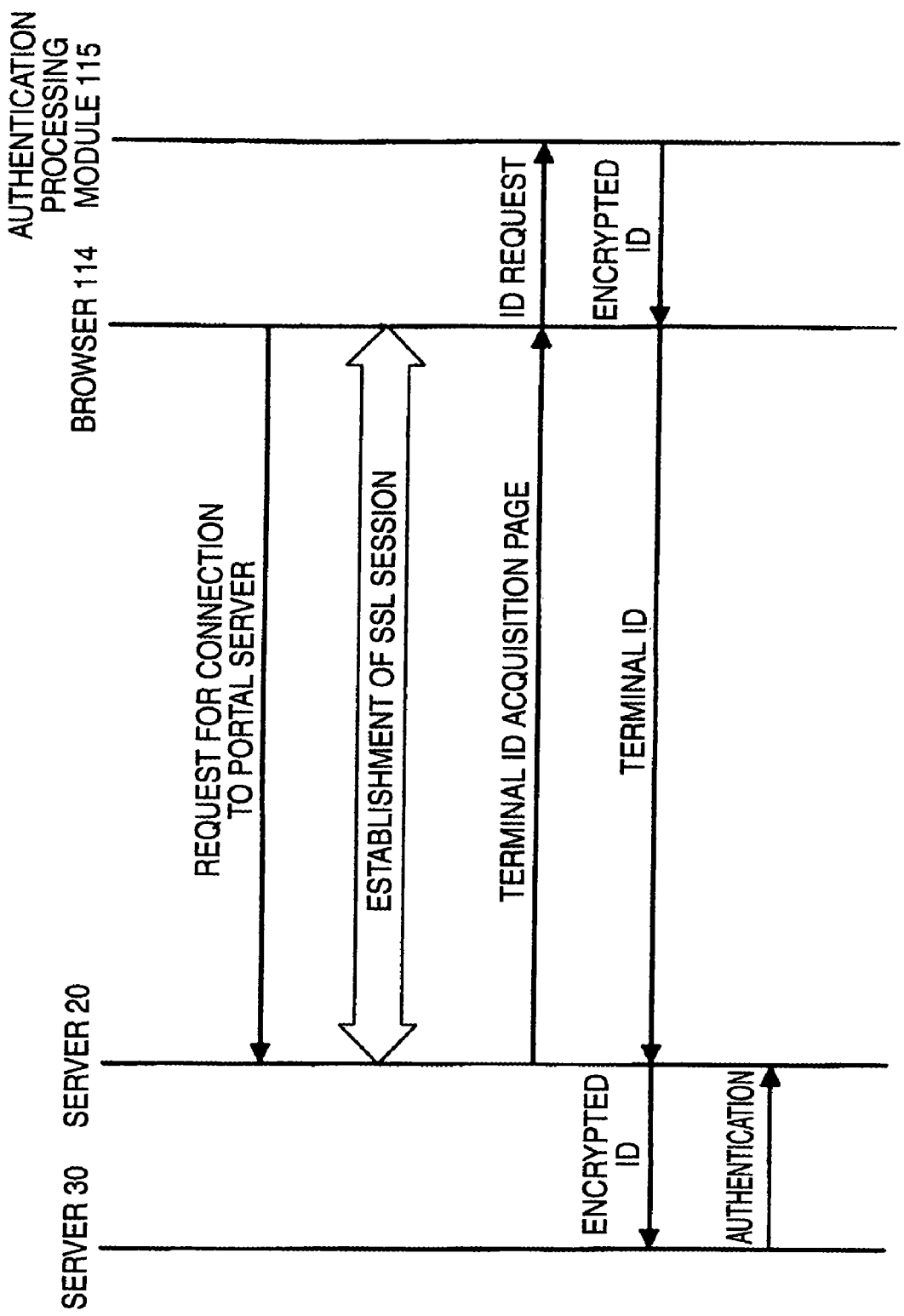
FIG. 4 shows an operation sequence of the information communication system of FIG. 1.

FIG. 4 shows an operation sequence of the information communication system 1 of FIG. 1. As shown in FIG. 4, this sequence for acquiring a terminal ID is performed via the browser 14.

When the browser 114 of the communication terminal apparatus 10 makes a secure access to the portal server 20, an encrypted communication is performed by using an SSL session (prescribed by RFC 2246) or the like. In the SSL session, the browser 114 interprets a public key certificate (server certificate) signed by a certificate authority (CA). If the sign of the certificate authority is verified, the portal server 20 is judged a legitimate one and a key exchange sequence for an encrypted communication is performed. The browser 114 shares a session key Ksec (first encryption key, first decryption key) with the portal server 20. The browser 114 serves as a sharing module for sharing a first encryption key with a first server.

When the communication terminal apparatus 10 has acquired, in the SSL session, a page containing a script for acquiring the terminal ID, the browser 114 performs processing of acquiring the terminal ID according to the script.

Figure 5:
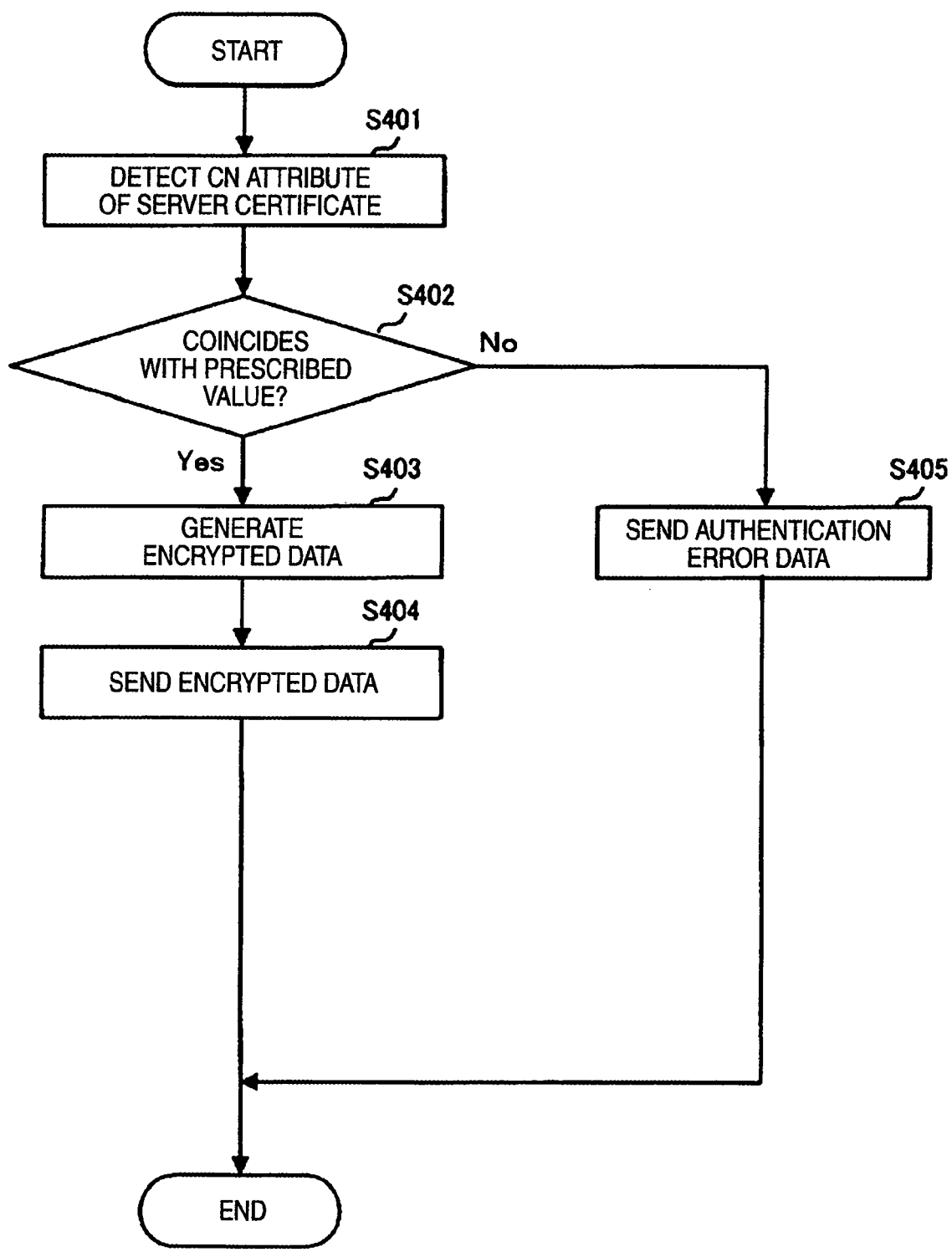
FIG. 5 is a flowchart showing an operation of a browser shown in FIG. 2.

FIG. 5 is a flowchart showing an operation of the browser 114. At step S401, the browser 114 extracts a particular item of a server certificate that was acquired in establishing an SSL session. For example, the browser 114 extracts name information or domain information (CN attribute). In this specification, domain information of the portal server 20 is used as authentication information to be used for authenticating the portal server 20.

At step S402, the browser 114 judges whether the detected domain information of the server certificate is domain information that a portal server of a service providing company is allowed to use. In making this judgment, the browser 114 compares the particular item (identification information: domain information) of the server certificate acquired in the SSL session (see FIG. 3) with a prescribed value. The prescribed value is domain information of at least one portal server of which the communication terminal apparatus 10 is to request content delivery. The prescribed value is a value that is set in advance between a service providing company or companies and the user and, for example, is stored in the memory 112 of the communication terminal apparatus 10 in list form (in the case where plural values are stored). Furthermore, to make it possible to perform authentication using encrypted data between the customer management server 30 and the authentication processing module 115, the service providing company and the user share a common key (second encryption key, second decryption key) Kd in advance. The common key Kd is stored in the memory 112, for example.

If the particular item of the server certificate coincides with the prescribed value (S402: yes), the browser 114 moves to step S403. If the particular item of the server certificate does not coincide with the prescribed value (S402: no), at step S405 the browser 114 returns authentication error data indicating an authentication failure to the portal server 20. The browser 114 serves as an authenticating module which, when receiving a request for sending identification information of the apparatus it belongs to, compares certificate information of the first server that was acquired in sharing the first encryption key with the first server with verification information retained in the apparatus and requests encrypting of the identification information of the apparatus if match is found.

Figure 6:
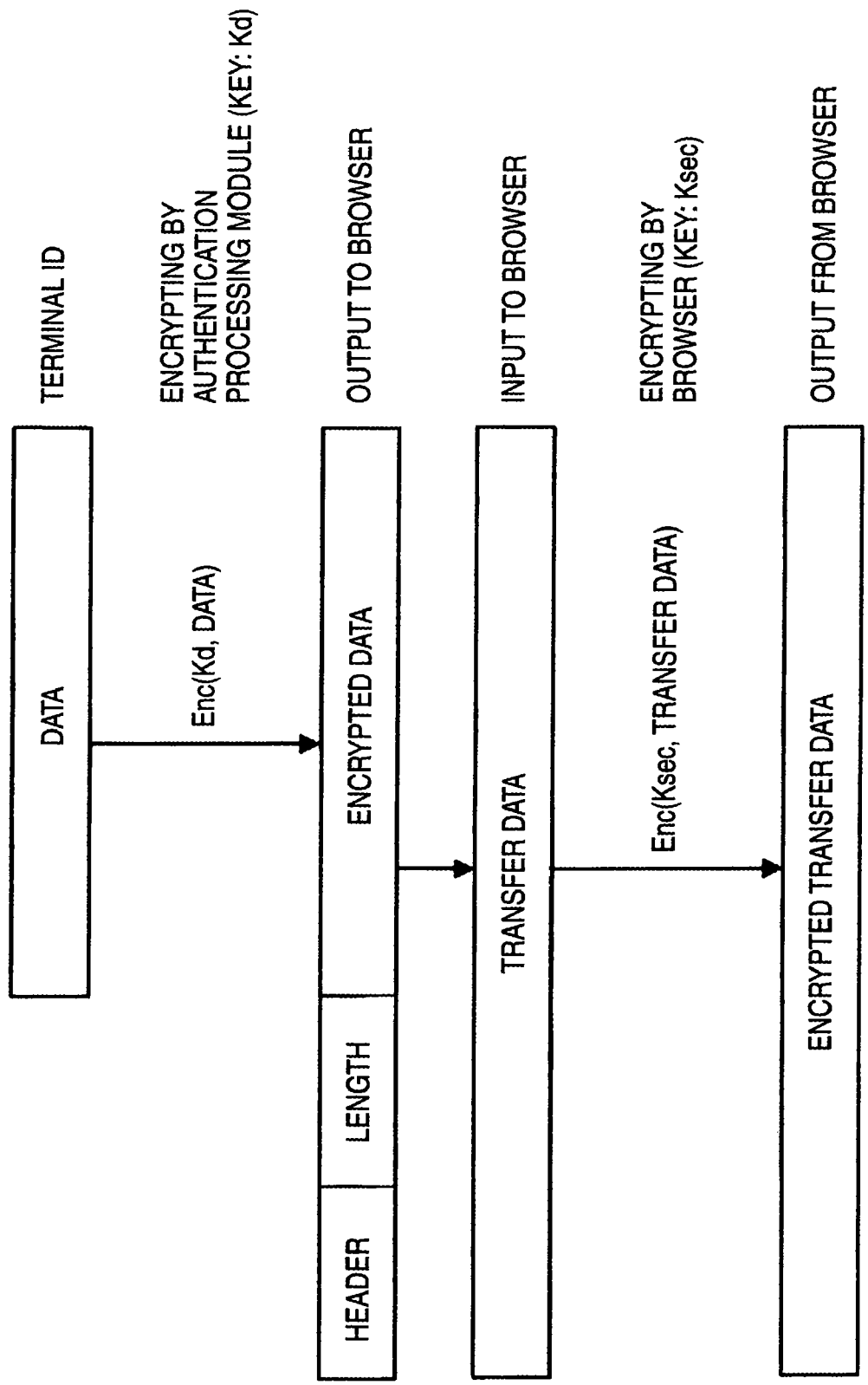
FIG. 6 shows how data is generated by the communication terminal apparatus according to the first embodiment.

FIG. 6 shows how data is generated by the communication terminal apparatus 10 according to the first embodiment. The browser 114 sends a terminal ID request to the authentication processing module 115.

In response to this request, the authentication processing module 115 encrypts, according to AES, for example, using the common key Kd, the terminal ID stored in the memory 112 or a terminal ID derived from information stored in the memory 112 according to a prescribed rule. The common key is a key that is shared by the customer management server 30 and the authentication processing module 115 in advance, and is stored in the memory 112, for example. The authentication processing module 115 generates transfer data by adding a header and frame length information to a encrypted terminal ID generated using the common key Kd. The authentication processing module 115 outputs the generated transfer data to the browser 114. The authentication processing module 115 serves as an encrypting module for encrypting identification information of the apparatus it belongs to using a second encryption key in response to a request.

At step S403, the browser 114 generates encrypted transfer data by encrypting the received transfer data using the session key Ksec which it shared with the portal server 20 in the SSL session. At step S404, the communication processing module 107 sends the generated encrypted transfer data to the portal server 20. The browser 114 and the communication processing module 107 function as a transmitting module for encrypting, using the first encryption key, the identification information of the apparatus it belongs to that was encrypted by using the second encryption key and sending encrypted identification information to the first server.

Figure 7:
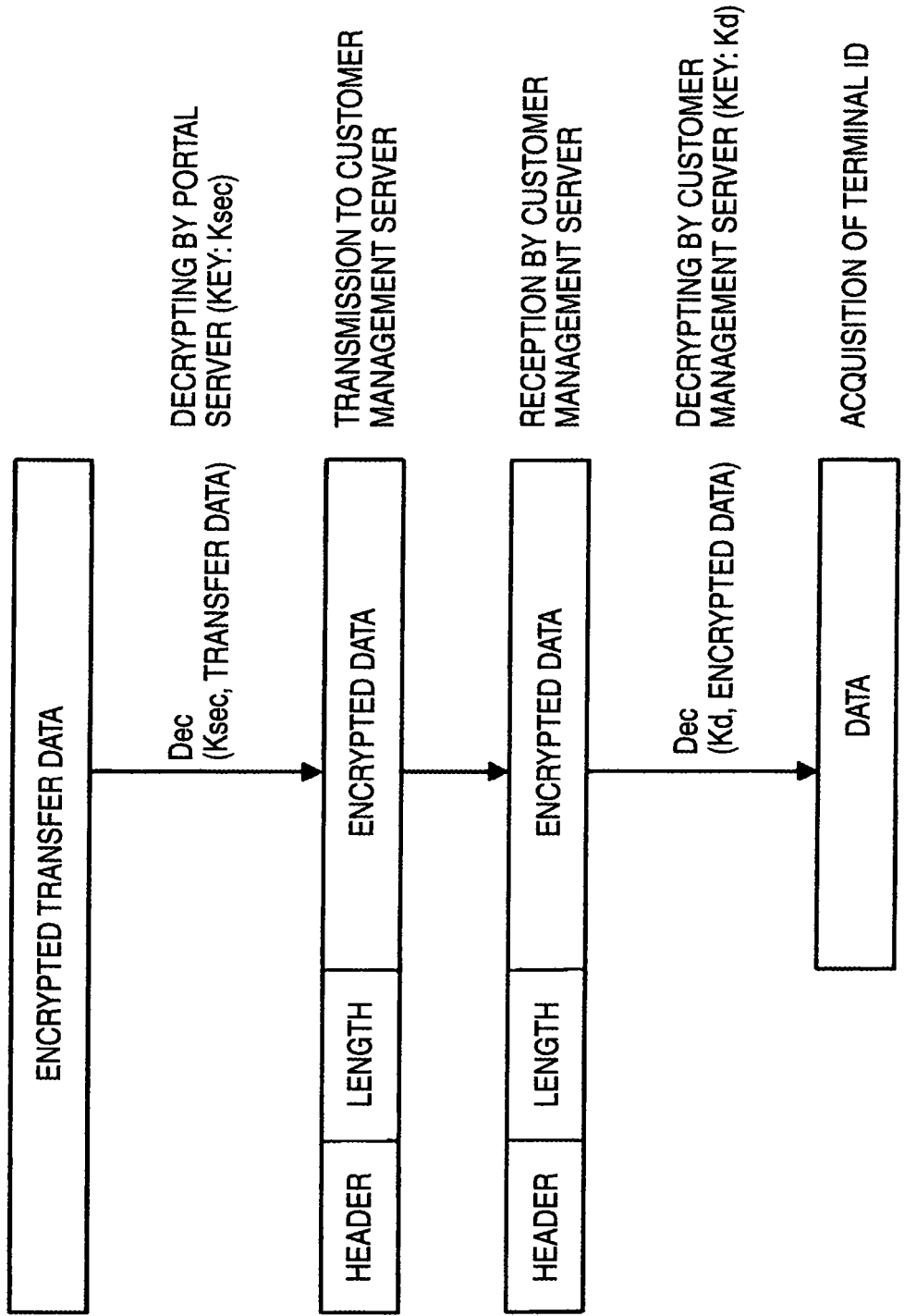
FIG. 7 shows how data is generated by servers according to the first embodiment.

FIG. 7 shows how data is generated by the servers 20 and 30 according to the first embodiment. In the portal server 20, the communication processing module 201 receives the encrypted transfer data from the communication terminal apparatus 10. The decrypting module 203 decrypts the encrypted transfer data into the encrypted terminal ID having the header and the frame length information using the session key Ksec. The communication processing module 202 sends the encrypted terminal ID having the header and the frame length information to the customer management server 30. The communication processing module 201 serves as a receiving module for receiving the transmitted identification information of the communication terminal apparatus. The decrypting module 203 serves as a decrypting module for decrypting the received identification information of the communication terminal apparatus using the first decryption key.

In the customer management server 30, the communication processing module 301 receives the encrypted terminal ID having the header and the frame length information from the portal server 20. The decrypting module 302 acquires data of the terminal ID by decrypting the encrypted terminal ID using the common key Kd. On the server sides the portal server 20 decrypts the terminal ID using the session key Ksec and the customer management server 30 decrypts the thus-decrypted terminal ID using the common key Kd. As a result, the terminal ID can be acquired securely. The communication processing module 301 serves as a receiving module for receiving the identification information of the communication terminal apparatus as decrypted by the first server. The decrypting module 302 serves as a decrypting module for decrypting the received identification information of the communication terminal apparatus using the second decryption key.

The authenticating module 303 compares the acquired terminal ID with a prescribed value. The prescribed value is a terminal ID of at least one communication terminal apparatus content delivery to which is permitted. The prescribed value is stored in the ID management database 304, for example, in advance in list form (in the case where plural prescribed values are stored). The authenticating module 303 serves as an authenticating module for authenticating the communication terminal apparatus based on the decrypted identification information of the communication terminal apparatus.

If the acquired terminal ID coincides with the prescribed value, the authenticating module 303 outputs, to the communication processing module 301, authentication success data to the effect that the authentication has succeeded. The communication processing module 301 sends the authentication success data to the portal server 20. If the acquired terminal ID does not coincide with the prescribed value, the authenticating module 303 sends authentication failure data to the effect that the authentication failed to the portal server 20 via the communication processing module 301.

In the portal server 20, when the communication processing module 202 receives the authentication success data, the distributing module 204 generates list information for content delivery. The list information is encrypted by the encrypting module 206 and sent from the communication processing module 201 to the communication terminal apparatus 10. If the communication processing module 201 specifies a particular content, a encrypted content is transmitted from the portal server 20 to the communication terminal apparatus 10. The communication processing module 202 serves as a receiving module for receiving an authentication result of the second server. The distributing module 204 serves as a distributing module for distributing a content to the communication terminal apparatus depending on the authentication result.

As described above, in the information communication system 1 according to the embodiment, information (terminal ID) is encrypted doubly, first using a common key Kd and then using a session key Ksec. And resulting encrypted information is sent from the communication terminal apparatus 10 to the portal server 20. Therefore, the information relating to the terminal ID is processed (securely) only in the customer management server 30 and the communication terminal apparatus 10 and the portal server 20 never processes its details. Separated information management is thus enabled.

Second Embodiment

The invention may employ a method in which an encryption key is shared in a simple manner by utilizing public key encryption such as RSA or elliptical encryption in addition to the method in which a common key Kd is shared in advance. The public key method is an encryption method which employs a key pair (Kp, Ks) and has a feature that data that was encrypted by using the key Kp can only be decrypted by using the key Ks.

In an information communication system according to a second embodiment, for example, each of a customer management server 30 and a communication terminal apparatus 10 possesses such a key pair (Kp, Ks).

Figure 8:
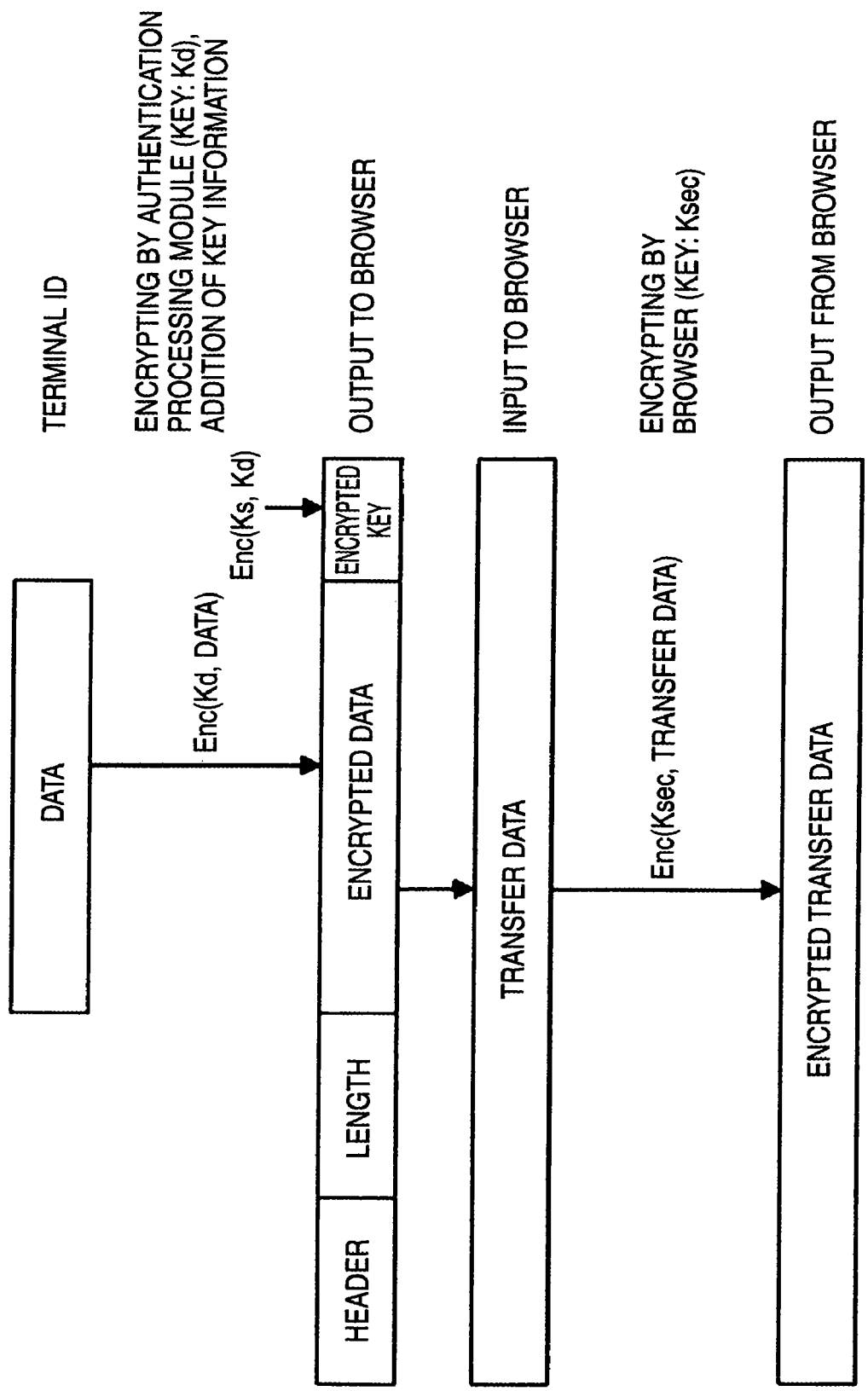
FIG. 8 shows how data is generated by an information terminal apparatus according to a second embodiment.

FIG. 8 shows how data is generated by the information terminal apparatus 10 according to the second embodiment. The configuration of the communication terminal apparatus 10 is the same as shown in the block diagram of FIG. 2. In the communication terminal apparatus 10, in response to a request for a terminal ID, the authentication processing module 115 generates a key Kd to be used for encrypting data by generating a random number. The authentication processing module 115 encrypts, using the thus-generated key Kd, a terminal ID stored in the memory 112 or a terminal ID that is derived from information stored in the memory 112 according to a predetermined rule. Then, the authentication processing module 115 encrypts the key Kd using the key Ks. The authentication processing module 115 generates transfer data by adding a header and a frame length information to the encrypted terminal ID generated by using the key Kd and the encrypted key Kd generated by using the key Ks. The authentication processing module 115 outputs the generated transfer data to the browser 114. The memory 112 serves as a retaining module for retaining one of a pair of keys of public key encryption as a third key. The authentication processing module 115 serves as a generating module for generating a random number.

The browser 114 generates encrypted transfer data by encrypting the received transfer data using a session key Ksec that is shared with the portal server 20 in an SSL session. The communication processing module 107 sends the thus-generated encrypted transfer data to the portal server 20.

Figure 9:
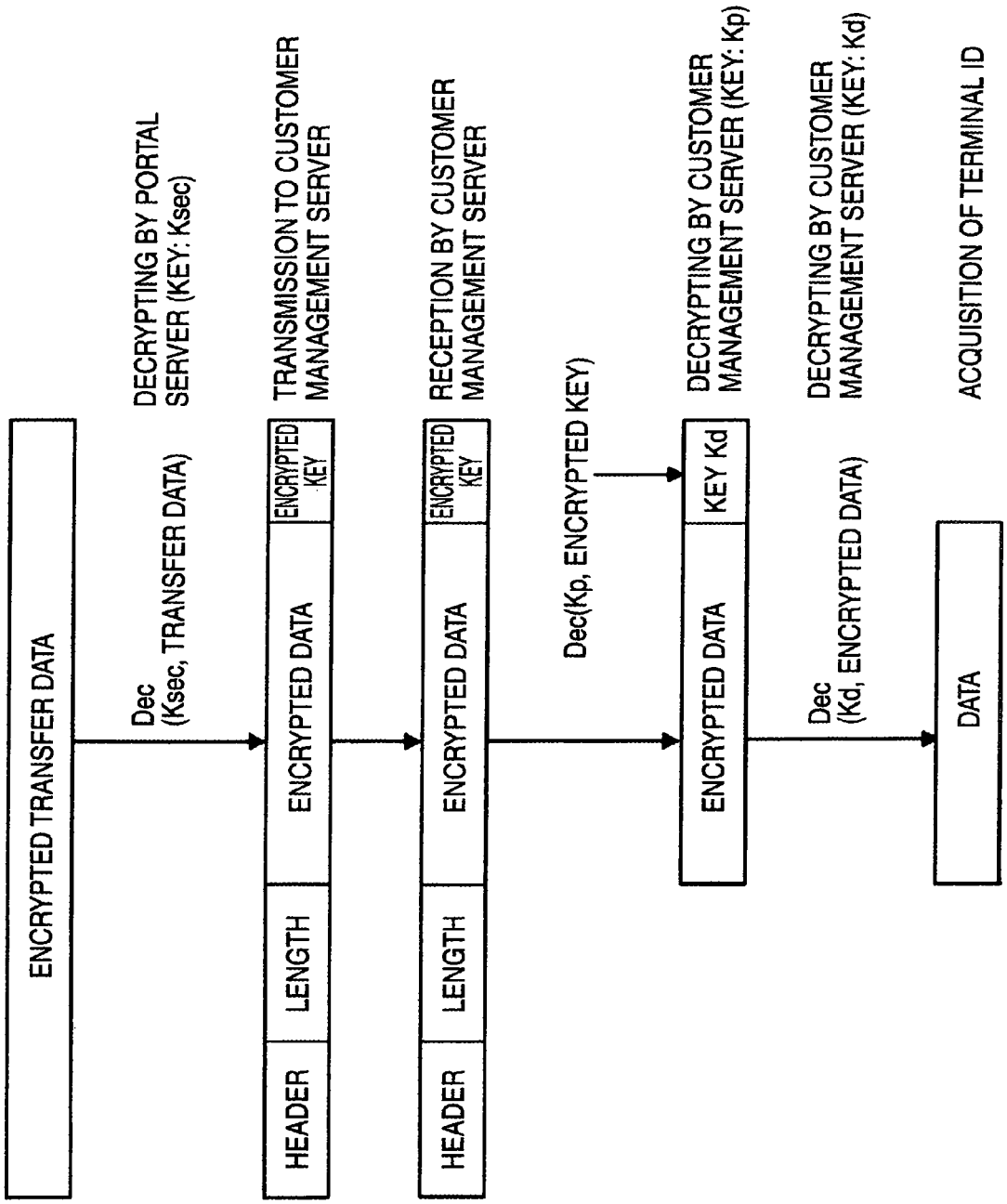
FIG. 9 shows how data is generated by servers according to the second embodiment.

FIG. 9 shows how data is generated by the servers 20 and 30 according to the second embodiment. The configurations of the servers 20 and 30 are the same as shown in the block diagram of FIG. 3. In the portal server 20, the decrypting module 203 performs the same decrypting operation as in the first embodiment and the communication processing module 202 sends resulting encrypted data to the customer management server 30.

In the customer management server 30, the communication processing module 301 receives the encrypted terminal ID having the header and the frame length information and the encrypted key from the portal server 20. The decrypting module 302 generates the key Kd by decrypting the encrypted key using the key Kp. Then, the decrypting module 302 acquires data of the terminal ID by decrypting the encrypted terminal ID using the decrypted key Kd. On the server side, the portal server 20 decrypts the encrypted terminal ID using the session key Ksec and the customer management server 30 decrypts the encrypted key Kd using the key Kp and decrypts the thus-decrypted terminal ID using the decrypted key Kd. In this manner, the terminal ID can be acquired even more securely.

As described above, in the information communication system according to the second embodiment, only a server having a key Kp can acquire a key Kd and acquire a terminal ID by through decrypting. As a result, encrypting of information is kept even more secure and sufficient secrecy of information can be secured.

Third Embodiment

Although in the above embodiments of the invention the terminal ID is assumed to be information that is unique to the terminal 10, a unique terminal ID may be employed for each service (portal server), for example.

In a third embodiment, for example, a terminal ID takes the form of a terminal-specific ID plus variable information (placed in a variable region). The terminal-specific ID is a terminal ID as used in the first and second embodiments. For example, the variable information is identification information for identification of a server (portal server).

Figure 10:
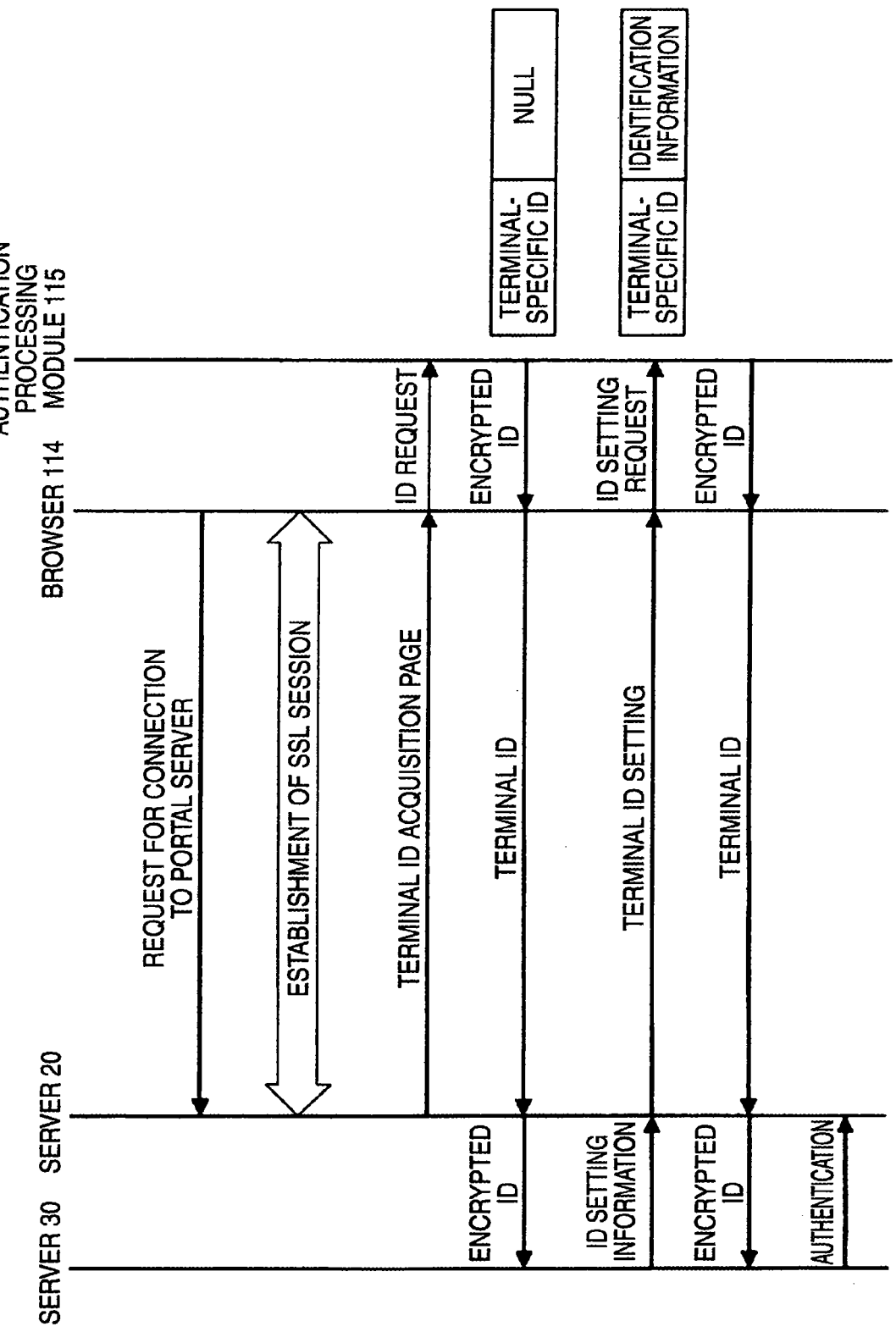
FIG. 10 shows an operation sequence of an information communication system according to a third embodiment.

FIG. 10 shows an operation sequence of an information communication system according to the third embodiment. The configuration of the communication terminal apparatus 10 is the same as shown in the block diagram of FIG. 2. Since no identification information of the portal server 20 is set, the authentication processing module 115 of the communication terminal apparatus 10 employs, as a terminal ID, a terminal-specific ID for identification of the communication terminal apparatus 10 plus an initial value "null" ("0") that is placed in the variable region. The authentication processing module 115 encrypts this terminal ID using a common key Kd. The authentication processing module 115 generates transfer data by adding a header and a frame length information to encrypted terminal ID generated by using the common key Kd. The authentication processing module 115 outputs the generated transfer data to the browser 114. The authentication processing module 115 serves as an identification information generating module for generating first identification information corresponding to the authenticated first server.

Figure 11:
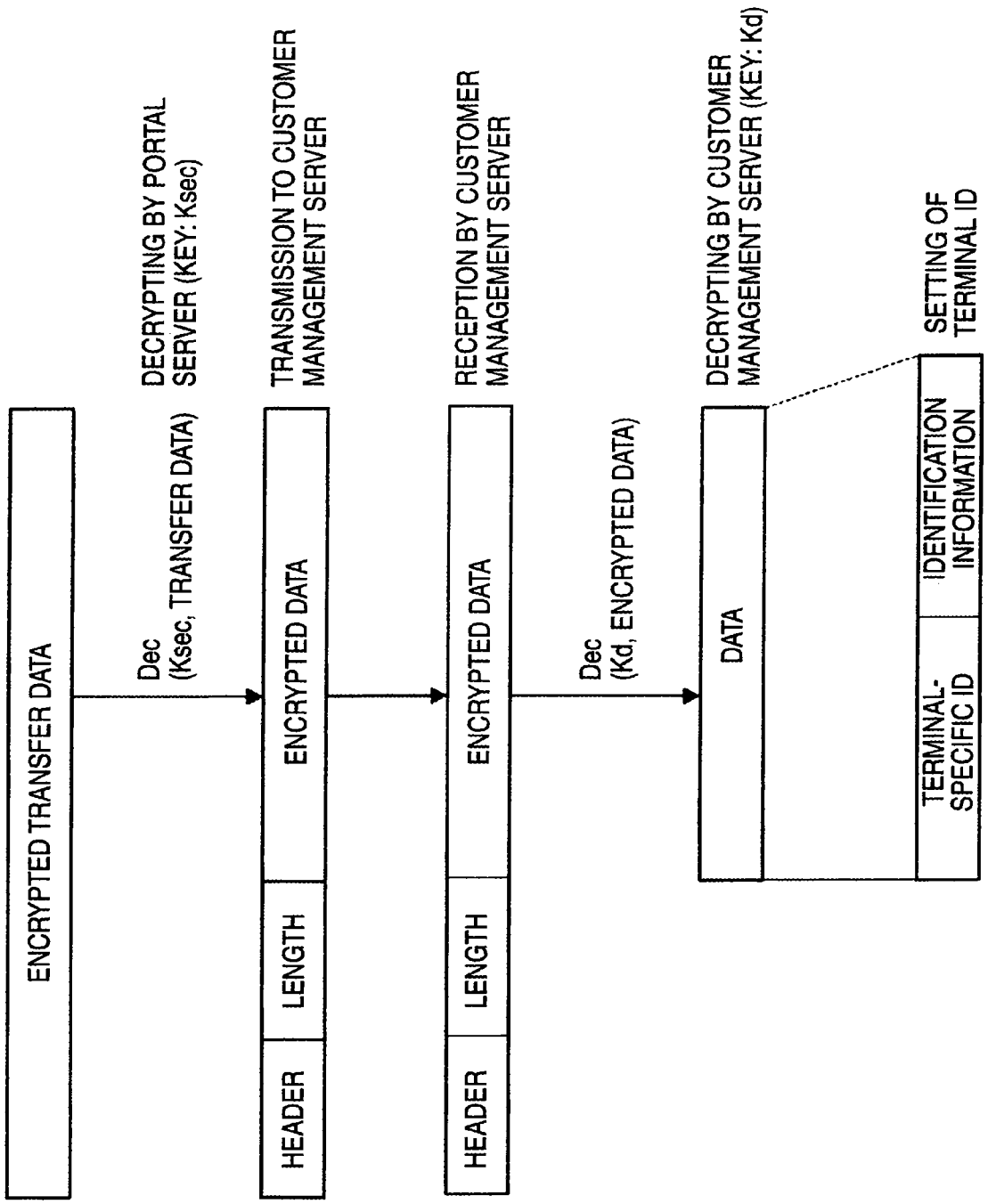
FIG. 11 shows how data is generated by servers according to the third embodiment.

FIG. 11 shows how data is generated by servers 20 and 30a according to the third embodiment. Whereas the configuration of the portal server 20 is the same as shown in the block diagram of FIG. 3, the configuration of the customer management server 30a is different from the customer management server 30 in that an encrypting module 305 (a broken-line block in FIG. 3) is added. Operating in the same manner as in the first embodiment, the portal server 20 decrypts the encrypted transfer data into the encrypted terminal ID having the header and the frame length information using a session key Ksec. Operating in the same manner as in the first embodiment, the customer management server 30 acquires data of the terminal ID by decrypting the encrypted terminal ID using a common key Kd.

If no identification information is registered in the encrypted transfer data transmitted from the communication terminal apparatus 10, no information is set in the variable region. Therefore, the encrypting module 305 of the customer management server 30 encrypts identification information of the portal server 20 to be set in the variable region by performing the same processing as the authentication processing module 115 of the communication terminal apparatus 10 does. More specifically, the encrypting module 305 encrypts a terminal ID having the terminal-specific ID and identification information of the portal server 20 using the common key Kd. Then, the encrypting module 305 generates transfer data by adding a header and frame length information to the terminal ID. The encrypting module 206 of the portable server 20 generates encrypted transfer data by encrypting the transfer data using the session key Ksec.

The communication terminal apparatus 10 stores the received terminal-specific ID and identification information collectively in the memory 112 as a terminal ID. The communication terminal apparatus 10 sends encrypted transfer data containing this terminal ID to the portal server 20. The customer management server 30 authenticates the communication terminal apparatus 10 based on the terminal ID which is the terminal-specific ID plus the identification information.

As described above, in the information communication system according to the third embodiment, a terminal ID containing a terminal-specific ID for identification of the communication terminal apparatus 10 and identification information for identification of the portal server 20 is encrypted and transmitted. As a result, different terminal IDs can be set for respective services (portal servers) and operations relating to the respective services can be made independent of each other.

Although the embodiments according to the present invention have been described above, the present invention is not limited to the above-mentioned embodiments but can be variously modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An information communication method comprising:
   sharing a first encryption key between a communication terminal apparatus and a first server;
   receiving, by the communication terminal apparatus, a request from the first server to send identification information of the communication terminal apparatus;
   authenticating, by the communication terminal apparatus, the first server based on (1) certificate information of the first server that is acquired in sharing the first encryption key with the first server and (2) verification information retained in the communication terminal apparatus;
   encrypting, by the communication terminal apparatus, the identification information of the communication terminal apparatus using a second encryption key;
   encrypting, using the first encryption key, according to an authentication result, by the communication terminal apparatus, the identification information of the communication terminal apparatus as encrypted by using the second encryption key, and transmitting resulting double-encrypted identification information of the communication terminal apparatus to the first server;
   receiving the transmitted identification information of the communication terminal apparatus by the first server;
   decrypting the received identification information of the communication terminal apparatus using a first decryption key by the first server;
   receiving identification information of the communication terminal apparatus decrypted by the first server by a second server for authenticating the communication terminal apparatus;
   decrypting the received identification information of the communication terminal apparatus using a second decryption key by the second server;
   authenticating the communication terminal apparatus based on decrypted identification information of the communication terminal apparatus by the second server;
   receiving an authentication result by the first server; and
   distributing a content by the first server to the communication terminal apparatus based on the received authentication result.

2. The information communication method of claim 1, wherein the second encryption key and the second decryption key are the same key.

3. The information communication method of claim 1 further comprising:
   retaining one of a pair of keys of a public key encryption method by the communication terminal apparatus as a third key and retaining the other of the pair of keys by the second server as a fourth key; and
   generating a random number by the communication terminal apparatus,
   wherein when encrypting the identification information using the second encryption key, the communication terminal apparatus encrypts the identification information of the communication terminal apparatus using the random number as the second encryption key and encrypts the second encryption key using the third key,
   wherein when decrypting the identification information using the second decryption key, the second server decrypts the second encryption key encrypted by the third key using the fourth key, and decrypts the identification information of the communication terminal apparatus using the decrypted second encryption key as the second decryption key.

4. The information communication method of claim 1, wherein the verification information retained in the communication terminal apparatus is at least a part of the certificate information of the first server.

5. An information communication method comprising:
   sharing a first encryption key between a communication terminal apparatus and a first server;
   receiving, by the communication terminal apparatus, a request from the first server to send identification information of the communication terminal apparatus;
   authenticating, by the communication terminal apparatus, the first server based on (1) certificate information of the first server that is acquired in sharing the first encryption key with the first server and (2) verification information retained in the communication terminal apparatus;
   encrypting, by the communication terminal apparatus, the identification information of the communication terminal apparatus using a second encryption key;
   encrypting, using the first encryption key, according to an authentication result, by the communication terminal apparatus, the identification information of the communication terminal apparatus as encrypted by using the second encryption key, and transmitting resulting double-encrypted identification information of the communication terminal apparatus to the first server;
   retaining one of a pair of keys of a public key encryption method by the communication terminal apparatus as a third key and retaining the other of the pair of keys by a second server as a fourth key; and
   generating a random number by the communication terminal apparatus,
   wherein when encrypting the identification information using the second encryption key, the communication terminal apparatus encrypts the identification information of the communication terminal apparatus using the random number as the second encryption key and encrypts the second encryption key using the third key,
   wherein when decrypting the identification information using a second decryption key, the second server decrypts the second encryption key encrypted by the third key using the fourth key, and decrypts the identification information of the communication terminal apparatus using the decrypted second encryption key as the second decryption key.

6. The information communication method of claim 5, wherein the second encryption key and the second decryption key are the same key.

7. The information communication method of claim 5, wherein the verification information retained in the communication terminal apparatus is at least a part of the certificate information of the first server.

* * * * *